(12) United States Patent
Weng et al.

(10) Patent No.: US 8,108,214 B2
(45) Date of Patent: Jan. 31, 2012

(54) SYSTEM AND METHOD FOR RECOGNIZING PROPER NAMES IN DIALOG SYSTEMS

(75) Inventors: Fuliang Weng, Mountain View, CA (US); Zhongnan Shen, Shanghai (CN); Zhe Feng, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 690 days.

(21) Appl. No.: 12/274,267

(22) Filed: Nov. 19, 2008

(65) Prior Publication Data

US 2010/0125456 A1    May 20, 2010

(51) Int. Cl.
*G10L 15/04* (2006.01)
(52) U.S. Cl. ........ 704/251; 704/231; 704/235; 704/270; 704/270.1; 704/275
(58) Field of Classification Search .................. 704/251, 704/231, 235, 270, 270.1, 275
See application file for complete search history.

(56) References Cited

U.S. PATENT DOCUMENTS

| | | | |
|---|---|---|---|
| 6,421,672 B1 | 7/2002 | McAllister et al. | |
| 2003/0233230 A1* | 12/2003 | Ammicht et al. | 704/235 |
| 2005/0049860 A1 | 3/2005 | Junqua et al. | |
| 2006/0247913 A1* | 11/2006 | Huerta et al. | 704/1 |
| 2008/0010058 A1 | 1/2008 | Weng et al. | |
| 2010/0179805 A1* | 7/2010 | Huerta et al. | 704/9 |

FOREIGN PATENT DOCUMENTS

| | | | |
|---|---|---|---|
| WO | W02006111230 A1 | 10/2006 | |
| WO | WO 2006/111230 A1 | 10/2006 | |

OTHER PUBLICATIONS

Form PCT/ISA/220, "PCT Notification of Transmittal of the International Search Report and the Written Opinion of the International Searching Authority, or the Declaration," 3 pgs.
Form PCT/ISA/210, "PCT International Search Report," 3 pgs.
Form PCT/ISA/237, "PCT Written Opinion of the International Searching Authority," 6 pgs.
Form PCT/ISA/220, "PCT Notification of Transmittal of the International Search Report and the Written Opinion of the International Searching Authority, or the Declaration," 1 pg.
Form PCT/ISA/237, "PCT Written Opinion of the International Searching Authority," 5 pgs.

\* cited by examiner

*Primary Examiner* — Qi Han
(74) *Attorney, Agent, or Firm* — Dergosits & Noah LLP; Geoffrey T. Staniford

(57) ABSTRACT

Embodiments of a dialog system that utilizes contextual information to perform recognition of proper names are described. Unlike present name recognition methods on large name lists that generally focus strictly on the static aspect of the names, embodiments of the present system take into account of the temporal, recency and context effect when names are used, and formulates new questions to further constrain the search space or grammar for recognition of the past and current utterances.

18 Claims, 4 Drawing Sheets

SYSTEM AND METHOD FOR RECOGNIZING PROPER NAMES IN DIALOG SYSTEMS

FIELD

Embodiments of the invention relate generally to dialog systems, and more specifically to recognizing proper names in dialog systems.

BACKGROUND

Spoken language is the most natural and convenient communication tool for people. With data storage capacities increasing rapidly, people tend to store greater amounts of information in databases. Accessing this data with spoken language interfaces offers people convenience and efficiency, but only if the spoken language interface is reliable. This is especially important for applications in eye-busy and hand-busy situations, such as driving a car. Man-machine interfaces that utilize spoken commands and voice recognition are generally based on dialog systems. A dialog system is a computer system that is designed to converse with a human using a coherent structure and text, speech, graphics, or other modes of communication on both the input and output channel. Dialog systems that employ speech are referred to as spoken dialog systems and generally represent the most natural type of machine-man interface. With the ever-greater reliance on electronic devices, spoken dialog systems are increasingly being implemented in many different machines.

In many spoken language interface applications, proper names, such as names of people, locations, companies, places, and similar things are very widely used. In fact, it is often the case that the number of proper names used in these applications is significantly large, and may involve foreign names, such as street names in a navigation domain or restaurant names in a restaurant selection domain. When used in high-stress environments, such as driving a car, flying a helicopter, or operating machinery, people tend to use short-hand terms, such as partial proper names and their slight variations. The present problems of proper name recognition in conventional spoken language interface applications include inadequate speech recognition accuracy in the speech recognizer component for these names, and inadequate recognition accuracy of these names with regard to the presence of these names in the system database.

Present name recognition methods on large name lists generally focus strictly on the static aspect of the names. Such systems do not utilize certain contextual elements that can significantly aid in the recognition process for proper names. Such contextual elements can include the temporal, recency, and context effect when names are used.

Present recognition systems may also be configured to confirm proper names by means of direct confirmation. In this method, the system responds to a question by rephrasing the user's utterance and directly mentioning the name or names, as they were understood by the system. One type of direct confirmation system explicitly asks the user whether he or she mentioned a specific name or names. For example, if the user is making an airplane reservation, he might say "I want to fly from Boston to New York". The system may then respond by saying: "You said Boston to New York, is that correct?" The user must then answer that this was correct or incorrect and provide any correction necessary. In order to make the system seem more conversational, the confirmation may be restated in a less direct manner. For example, if the user says "I want to fly from Boston to New York" the system my respond by saying "OK, when would you like to fly from Boston to New York?" This type of confirmation, called implicit confirmation, relies on the fact that if the system incorrectly understood and wrongly stated one or more of the names, the user would provide a correction; but if the system correctly repeated the names, the user would not say anything about the names. By including the proper names in the response, the system has directly confirmed the names as understood by the system. Direct confirmation systems are generally cumbersome in that they involve restatement of the proper names uttered by the user and are thus overly repetitive, adding time and possibly frustration to the user experience. These systems are also disadvantageous in that they may tend to repeat or propagate errors that are made during the speech recognition process.

What is needed, therefore, is a dialog system that utilizes contextual information and tries to address the issues in the proper name recognition task for spoken language interface applications, namely improving the speech recognition accuracy for these names, and the recognition accuracy of these names.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of a dialog system that utilizes contextual information to perform recognition of proper names are described. Unlike present name recognition methods on large name lists that generally focus strictly on the static aspect of the names, embodiments of the present system take into account of the temporal, recency and context effect when names are used, and formulates new questions to further constrain the search space or grammar for recognition of the past and current utterances.

In the following description, numerous specific details are introduced to provide a thorough understanding of, and enabling description for, embodiments of the dialog system response generation system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

During typical dialog interaction sessions, the confidence level for proper name recognition is usually not very high, at least for certain names. To improve proper name recognition, systems have been developed to use certain contextual information, such as using knowledge of a specific domain or a user model. Embodiments of the proper name recognition system build and utilize the contextual information through the formulation of indirect confirmations that may be provided in the form of questions derived from user input in previous dialog turns.

Figure 1:
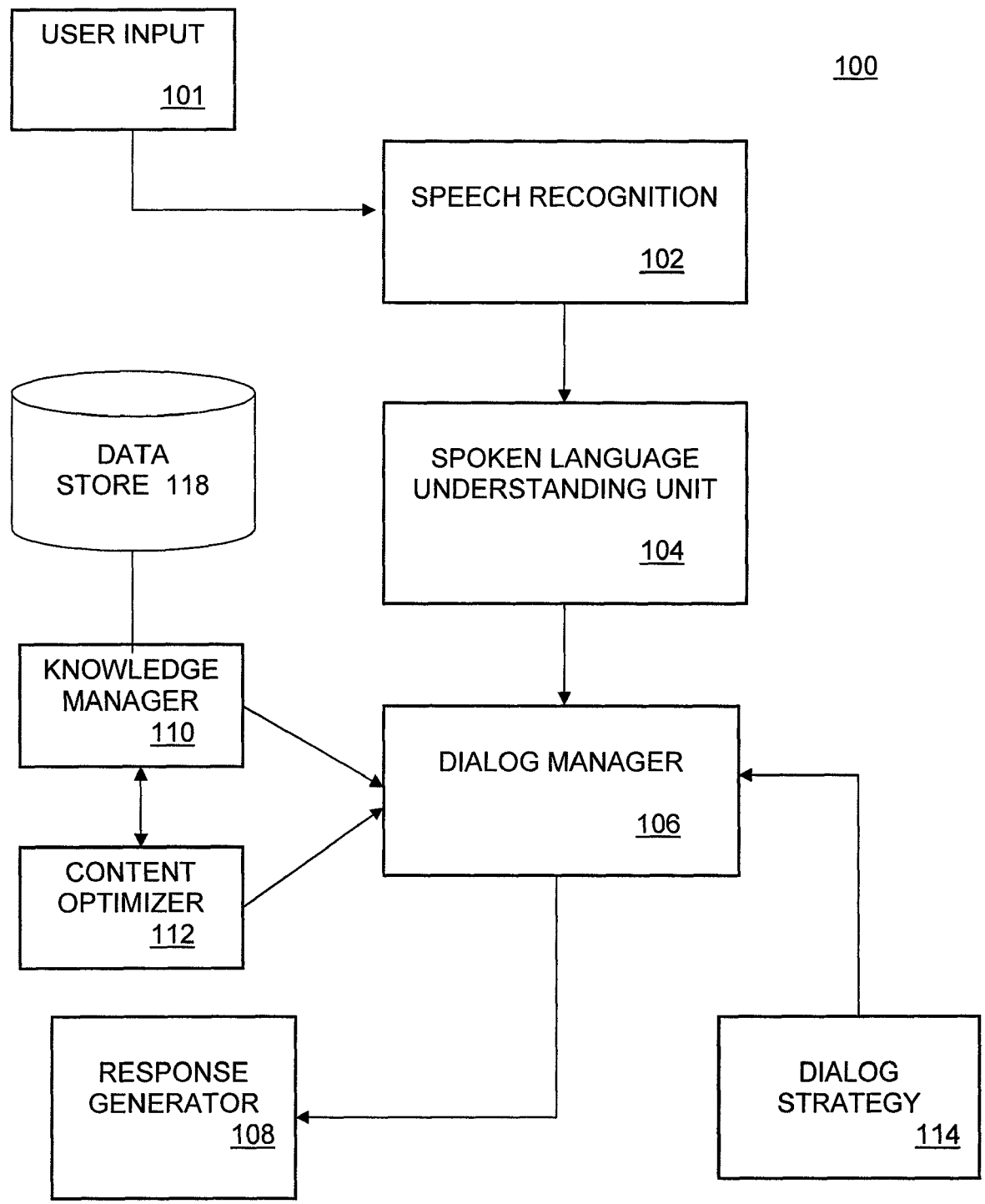
FIG. 1 is a block diagram of a spoken dialog system that incorporates an improved proper name recognition unit, according to an embodiment.

FIG. 1 is a block diagram of a spoken dialog system that incorporates a proper name recognition unit that utilizes contextual information, according to an embodiment. For purposes of the present description, any of the processes executed on a processing device may also be referred to as modules or components, and may be standalone programs executed locally on a respective device computer, or they can be portions of a distributed client application run on one or more devices. The core components of system 100 include a spoken language understanding (SLU) module 104 with multiple understanding strategies for imperfect input, an information-state-update or other kind of dialog manager (DM) 106 that handles multiple dialog threads and mixed initiatives, a knowledge manager (KM) 110 that controls access to ontology-based domain knowledge, and a content optimizer 112 that connects the dialog manager and the knowledge manager for resolving ambiguities from the users' requests, regulating the amount of information to be presented to the user, as well as providing recommendations to users. In one embodiment, spoken user input 101 produces acoustic waves that are received by a speech recognition unit 102. The speech recognition unit 102 can include components to provide functions, such as dynamic grammars and class-based n-grams. In the case where the user input 101 is text-based rather than voice-based, the speech recognition unit 102 is bypassed, and simulated user input is provided directly to the spoken language understanding unit 104. A response generator 108 provides the output of the system 100. The response generator 108 generates audio and/or text output based on the user input. Such output can be an answer to a query, a request for clarification or further information, reiteration of the user input, or any other appropriate response. The response generator 108 utilizes domain information when generating responses. Thus, different wordings of saying the same thing to the user will often yield very different results.

System 100 illustrated in FIG. 1 includes a large data store 118 that stores a large number of names. Throughout the description, the term "name" is used to denote any type of entity label, such as the name of a person, place or thing, or any other descriptor or label for an object or entity. In general, depending upon the domain or dialog system application, the number of names in data store 118 could be very large, e.g., on the order of tens to hundreds of thousands of names. To improve the recognition accuracy of names in the user utterance, the large name list can be pared down into a smaller list of names with weight values attached based on the context of the names used in the input speech of recent conversations. Names outside of the smaller list are assigned a weight value of zero.

Data store 118 can hold names organized into one or more databases. One database can be a static database that contains all possible names, commonly used names (such as common trademarks or references), or names frequently used by the user (such as derived from a user profile or model). In a static database, the weight values are precomputed before a conversation is started, and is typically based on frequency of usage. A second database may be a dynamic database that constantly takes the names in the context of the utterance (such as names just mentioned) from the DM unit 106. A name list can be built that contains full and partial names that are appended with proper weighting values depending on the context in which the names are used and other characteristics of the names. For example, a high weight is given to names that have been mentioned recently, a lower weight is given to common names, and a lowest weight is given to names that have not been used. In general, each name in the name list or lists are assigned weights depending upon the databases from which they were derived. In general, names from the dynamic database are weighted higher than names from the static database. Weights can be assigned based on any appropriate scale, such as 0 to 100%, or any similar scale, and are used to help the recognition system improve the recognition accuracy.

The embodiment of system 100 also includes a dialog strategy component 114. The dialog strategy component is invoked when the dialog manager 106 detects that a name is recognized with a relatively low degree of confidence. For names that the dialog manager detects a high enough level of recognition, dialogs are processed through the standard response process defined by the system.

The dialog strategy component 114 implements a name recognition system that includes an indirect confirmation method. Unlike direct confirmation in which the names uttered by the user are directly restated by the system (e.g., "You said Boston to New York, correct?"), an indirect confirmation system generates new questions for the user that are based on the names, but do not restate the names. This type of system reduces the repetitiveness of direct confirmation, is more conversational, and adds potentially relevant data to the user model. For example, if the user says "I want to fly from Boston to New York" the system my respond by saying "OK, when would you like to leave Massachusetts?" This type of indirect confirmation requires the formulation of a related question based on the properly recognized proper names in the user utterance. If the system had misunderstood "Boston" for "Austin," for example, the indirect confirmation may have been stated as "OK, when would you like to leave Texas?" In this case, the user would need to correct the system by restating the question or clarifying the stated names. By using a different name and not trying to repeat the name uttered by the user, the indirect confirmation system eliminates the potential problem associated with direct confirmation systems of the user not recognizing that the repeated name was incorrect. That is, if the system stated "Austin" instead of "Boston", the user may hear "Boston" instead of "Austin", as he originally anticipated and not realize that the system made a mistake. By formulating a different statement, the system more fully engages the user and provides a different basis of understanding and clarification.

The related question can be formulated based on different types of information available to the system as well, such as user location, device type, and any other objective information available to the system. For example, if the user is in a car driving through Northern California, and requests that the system find a restaurant in Mountain View, the system may confuse this place name with Monterey. In this case, the system could state back to the user: "As you drive through Silicon Valley . . . . " This indirect confirmation generated by the system utilizes the fact that the location of the user was placed in the vicinity of Silicon Valley rather than the Monterey peninsula and that the user was in an automobile at the time of the request. If the system's understanding was correct, the user could continue the dialog with the system, otherwise he or she could provide correction information. Additional indirect confirmation questions or statements can be provided based on the user response to the system output. The system confidence levels for the speech recognition stage to generate responses until a sufficient level of recognition accuracy is attained.

Figure 2:
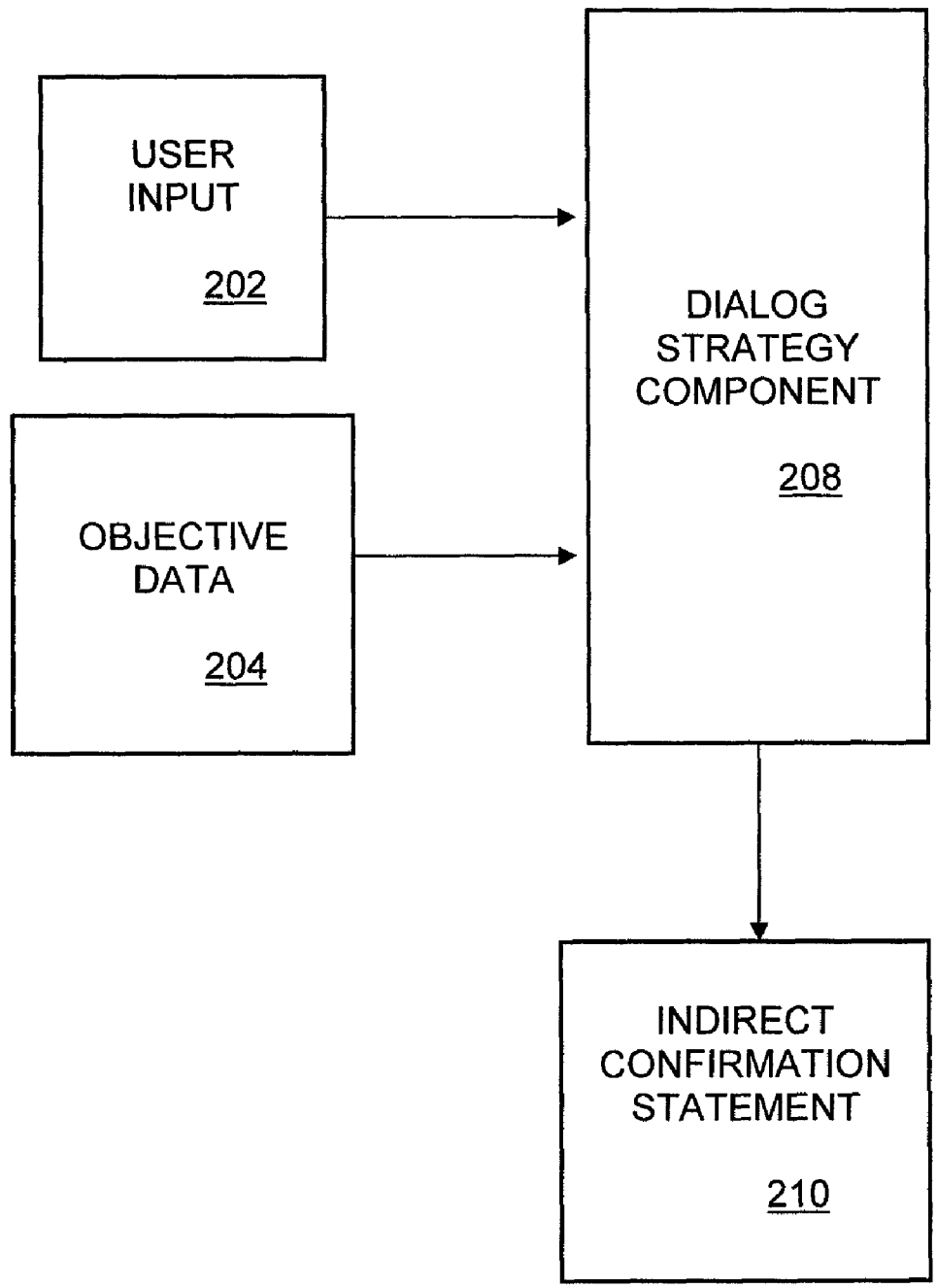
FIG. 2 is a block diagram that illustrates the components for generating an indirect confirmation statement, under an embodiment.

FIG. 2 is a block diagram that illustrates the components for generating an indirect confirmation statement, under an embodiment. As shown in system 200, the dialog strategy component takes data from both the user input 202 and objective data sources 204 to generate the indirect confirmation statement or question 210. The objective data 204 could be provided from various sources, such as user profile databases, location sensor, device descriptors, and so on.

In one embodiment, dialog strategy component 114 keeps track of the user utterances, semantic content and data obtained from the user utterances in the past to recognize the current utterance during the interaction. Confidence levels are utilized to measure the accuracy of the recognition. One or more threshold confidence levels may be defined to implement the process. Specifically, if the confidence score of the current recognized utterance is high, the recognized utterance, semantic content and data retrieved from the utterance are used for continuing the interaction with the user. If the confidence score of the recognized utterance or the semantic content is below a certain defined threshold, a related indirect confirmation question or statement is generated and is provided to the user by the system as part of the dialog process.

Figure 3:
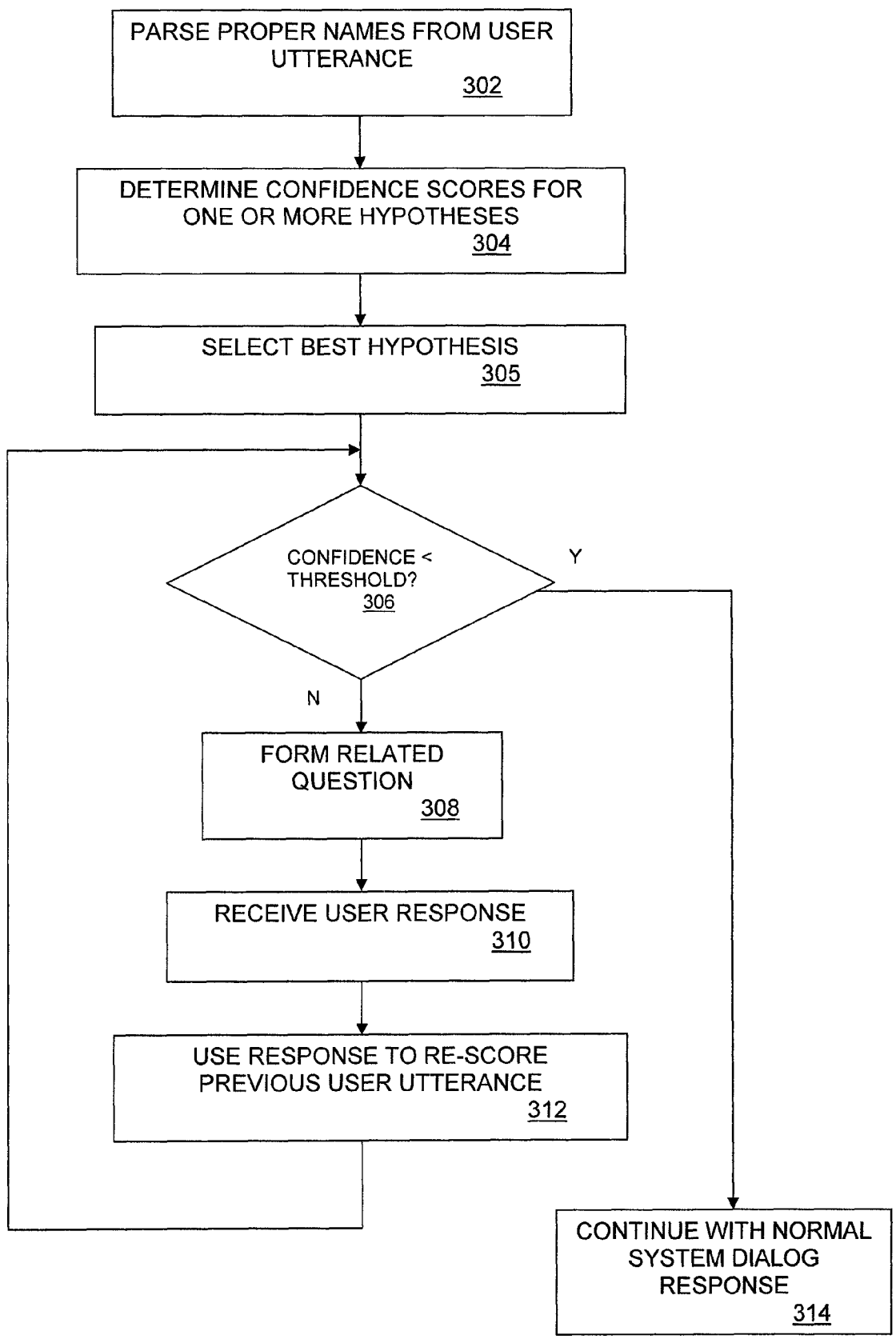
FIG. 3 is a flowchart illustrating a method of generating an indirect confirmation statement, under an embodiment.

FIG. 3 is a flowchart illustrating a method of generating an indirect confirmation statement, under an embodiment. In block 302, the speech recognizer component receives the user utterance, and the system parses the proper name or names in the utterance. The system attempts to recognize the proper name and determines an initial confidence score for this recognition. A threshold confidence level is set. In one embodiment, the threshold confidence level is set empirically based on the speech recognizer. The confidence level can be provided by the recognizer 102 unit automatically (such as in the case of a commercially available unit), or it can be defined by a system administrator or designer. Confidence levels are typically specified in a percentage range of 0 to 100%, and a typical threshold value may be around 75-85%. In this case, if a recognizer returns a hypothesis that has a confidence level greater than the threshold, the system will accept the system response as an accurately recognized name. Any value less than the threshold will result in the hypothesis being rejected. Different recognizers may have different threshold levels depending on application requirements and system constraints.

The speech recognizer unit 102 may generate one or more hypotheses of a recognized name. For example, for the flight booking question above, the speech recognizer may produce the following three recognition hypotheses: Boston, Austin, and Houston. Of these three, or any number of hypotheses, one might be selected as better than the others based on the confidence score, or other data. For example, the system may know that the user is on the east coast of the United States at the time of the utterance. In this case, Boston is a better choice than either Austin or Houston, even if one of those city names has a higher confidence score. In block 305, the system selects the best hypothesis out of the number available. This choice can be made on the basis of confidence score and/or any external information available to the system, and can be dictated by system and/or user defined rules.

The confidence score of the selected hypothesis is then compared to the defined confidence threshold, block 306. If the confidence score of the recognized utterance or the semantic content is low, a related question, which is formulated based on contextual information, is prompted to the user by the system, block 308. The user response to this related question is then received and processed, block 310. This response is then used to constrain the re-recognition or re-scoring of the previous unconfident user utterances and information obtained in the past interaction, block 312. This process repeats from block 306 in which the threshold comparison is performed, until a sufficiently high confident result or a high confidence of combined results from the user is obtained. Once the recognized result and information obtained from the answer utterance has a high enough confidence level, that is, one that is greater than the defined threshold, the proper name is accepted as recognized, and the dialog system continues with a normal system response.

As shown in block 308 of FIG. 3, a related question is formed if the confidence level of the selected hypothesis is below the defined confidence threshold. The related question can be formulated in different ways. In one embodiment, the question may be formulated based on the n-best list or lattice produced by the system for the current user utterance, knowledge base or relations in a data base for the applications. The n-best list is generated from the speech recognizer which takes the input acoustic signal to produce one or more hypotheses of recognition, and a lattice is a compressed representation of the n-best list. When the user answers to the question, the recognized result can be used to constrain the re-recognition or re-scoring of the previous user utterance if it has a high confidence. During the re-recognition, the name candidates are refined based on information collected from user's answer. If more than one hypothesis was available for selection, the iterative process of posing related indirect confirmation questions and refining the confidence scoring will help the system select among the different possible hypotheses. For example, if the hypotheses comprise the following: Boston, Austin, and Houston, a positive user response to the related question "So, you plan to fly out of Massachusetts" will result in the system selecting Boston as the recognized name. If, however, the user responds by saying "No, I plan to fly out of Texas", the system must then ask another follow up question, because although Boston has been eliminated, either Austin or Houston are still possible candidates. In this case, the system may follow up with another question, such as "So, you will be flying out of the state capital . . . . " The user response to this additional related question will then allow the system to select between the two remaining choices.

In one embodiment, a highly confident answer can also be used to re-score the previous recognized result and the data retrieved by the user utterance. For instance, if there is an overlap between the user utterances or the data obtained from these user utterances, the confidence for the overlap part is combined by a predefined model or function, e.g., a certain weighted aggregating function. Multiple steps can be performed until a highly confident result or a high confidence of combined results from the user is obtained. In this case, overlaps may comprise repeated words between the system response and user utterances.

Figure 4:
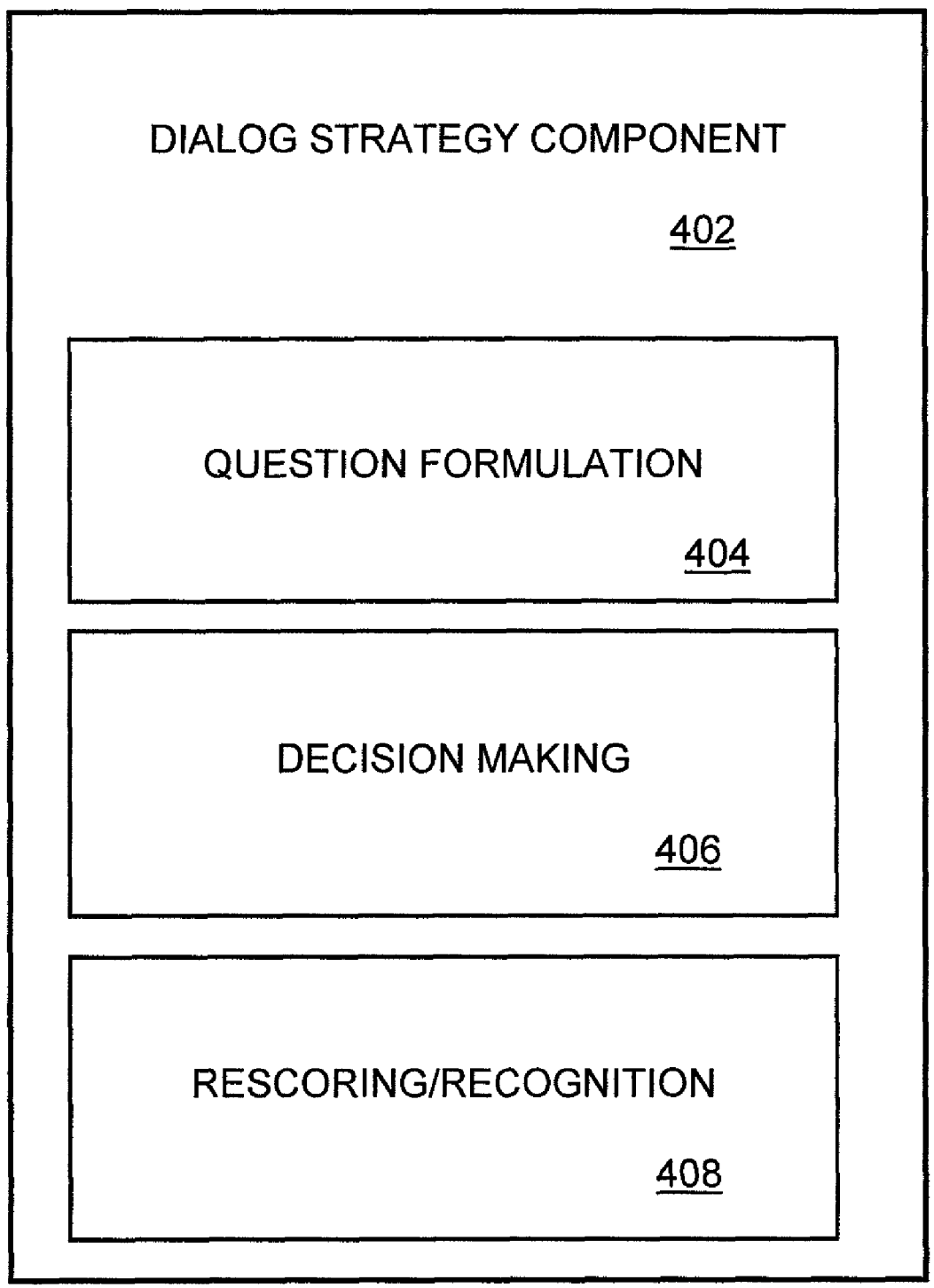
FIG. 4 is a block diagram of the functional components of the dialog strategy component, under an embodiment.

FIG. 4 is a block diagram of the functional components of the dialog strategy component, under an embodiment. As shown in FIG. 4, the dialog strategy component includes a question formulation module 404 that formulates the related questions, a decision making component 406, and a re-scoring/re-recognition component, 408. In general, the related questions, impacts the language model portion of the speech recognizer. The language module constrains the search. The change of the model will produce different results for following questions. This introduces a degree of dynamic adaptiveness to the system.

The dialog strategy component uses contextual information that is incorporated in constraining and refining name candidates for speech recognition. Anchoring on the confident portions of the utterance with clarification dialogs can make use of the semantic relation internal in the data to narrow down the types of names for recognition.

Aspects of the name recognition process described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: microcontrollers with memory (such as EEPROM), embedded microprocessors, firmware, software, etc. Furthermore, aspects of the content serving method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the response generation process is not intended to be exhaustive or to limit the embodiments to the precise form or instructions disclosed. While specific embodiments of, and examples for, processes in computing devices are described herein for illustrative purposes, various equivalent modifications are possible within the scope of the disclosed methods and structures, as those skilled in the relevant art will recognize. The elements and acts of the various embodiments described above can be combined to provide further embodiments. These and other changes can be made to the response generation process in light of the above detailed description.

In general, in the following claims, the terms used should not be construed to limit the disclosed method to the specific embodiments disclosed in the specification and the claims, but should be construed to include all operations or processes that operate under the claims. Accordingly, the disclosed structures and methods are not limited by the disclosure, but instead the scope of the recited method is to be determined entirely by the claims.

While certain aspects of the disclosed system and method are presented below in certain claim forms, the inventors contemplate the various aspects of the methodology in any number of claim forms. For example, while only one aspect may be recited as embodied in machine-readable medium, other aspects may likewise be embodied in machine-readable medium. Accordingly, the inventors reserve the right to add additional claims after filing the application to pursue such additional claim forms for other aspects.

What is claimed is:

1. A computer-implemented method in a dialog system, comprising:
    receiving a user utterance including a proper name;
    recognizing the proper name in the user utterance;
    determining a first confidence score for the recognized proper name;
    generating a first machine response the user utterance including an indirect confirmation question related to the proper name, wherein the first machine response does not repeat the proper name, if the first confidence score is below a defined threshold value;
    receiving a user response to the indirect confirmation question; and
    modifying the first confidence score to generate a second confidence score based on the user response.

2. The method of claim 1 wherein the proper name comprises any part of speech describing a person, place or thing.

3. The method of claim 2 wherein the best candidate name is the name with the first confidence score that is closest to the defined threshold.

4. The method of claim 1 wherein the user utterance comprises a query input to a speech recognition stage of the dialog system, the method further comprising:
    parsing the proper name from the user utterance;
    generating one or more hypotheses to identify a plurality of candidate names, each candidate name potentially corresponding to the uttered proper name; and
    selecting the best proper name from the plurality of candidate names.

5. The method of claim 1 further comprising:
    defining one or more characteristics associated with the uttered proper name; and
    formulating the indirect confirmation question by incorporating at least one characteristic of the one or more characteristics in the first machine response.

6. The method of claim 5 wherein the indirect confirmation question is formulated based on an n-best list.

7. The method of claim 5 further comprising generating a second machine response the user utterance including an additional indirect confirmation question related to the proper name, wherein the second machine response does not repeat the proper name, if the second confidence score is below the defined threshold value.

8. The method of claim 7 further comprising formulating the additional indirect confirmation question by incorporating at least one additional characteristic of the one or more characteristics from the first machine response in the second machine response.

9. The method of claim 1 further comprising continuing with a normal dialog response process if the first confidence score is above the defined threshold value.

10. The method of claim 1 further comprising continuing with a normal dialog response process if the second confidence score is above the defined threshold value.

11. A dialog system, comprising:
- a speech recognition unit receiving a user utterance including a proper name;
- a recognizer unit recognizing the proper name in the user utterance;
- a scoring unit determining a first confidence score for the recognized proper name; and
- a question formulation unit generating a first machine response the user utterance including an indirect confirmation question related to the proper name, wherein the first machine response does not repeat the proper name, if the first confidence score is below a defined threshold value, wherein the speech recognizer unit receives a user response to the indirect confirmation question, and the scoring unit modifies the first confidence score to generate a second confidence score based on the user response.

12. The system of claim 11 wherein the proper name comprises any part of speech describing a person, place or thing.

13. The system of claim 12 wherein the best candidate name is the name with the first confidence score that is closest to the defined threshold.

14. The system of claim 11 further comprising:
- a parser parsing the proper name from the user utterance; and
- a decision making unit generating one or more hypotheses to identify a plurality of candidate names, each candidate name potentially corresponding to the uttered proper name, and selecting the best proper name from the plurality of candidate names.

15. The system of claim 11 wherein the question formulation unit defines one or more characteristics associated with the uttered proper name; and formulates the indirect confirmation question by incorporating at least one characteristic of the one or more characteristics in the first machine response.

16. The system of claim 15 wherein the indirect confirmation question is formulated based on an n-best list.

17. The system of claim 15 wherein the system generates a second machine response the user utterance including an additional indirect confirmation question related to the proper name, wherein the second machine response does not repeat the proper name, if the second confidence score is below the defined threshold value.

18. The system of claim 17 wherein the question formulation unit further formulates the additional indirect confirmation question by incorporating at least one additional characteristic of the one or more characteristics from the first machine response in the second machine response.

* * * * *